May 22, 1973 M. SHOELD 3,734,779
SPIRAL ELECTRODE STORAGE BATTERY WITH IMPROVED ELECTRODE
ASSEMBLY CONSTRUCTION AND METHOD OF MAKING
Filed Jan. 20, 1972 2 Sheets-Sheet 2
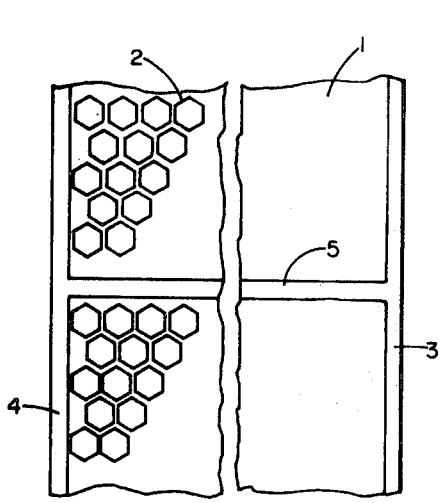
FIGURE 2
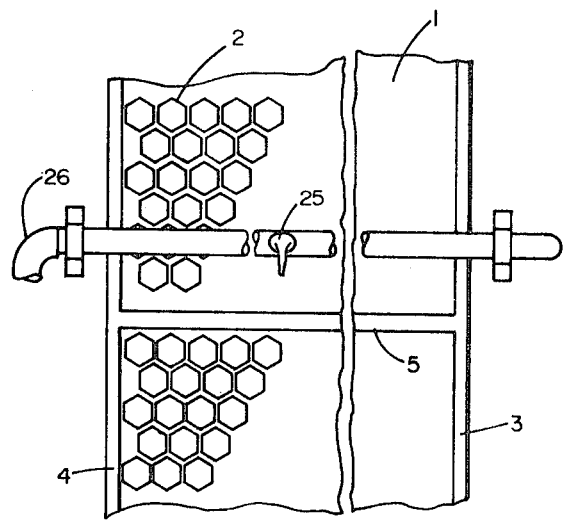
FIGURE 5
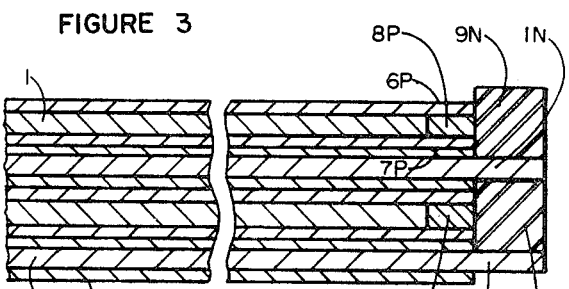
FIGURE 3
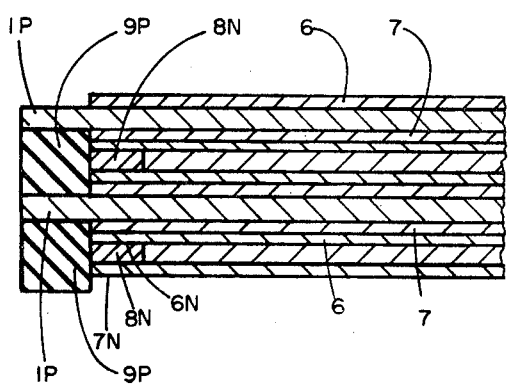

United States Patent Office 3,734,779
Patented May 22, 1973

3,734,779
SPIRAL ELECTRODE STORAGE BATTERY WITH IMPROVED ELECTRODE ASSEMBLY CONSTRUCTION AND METHOD OF MAKING
Mark Shoeld, 2140 E. Graves Ave., Orange City, Fla. 32763
Filed Jan. 20, 1972, Ser. No. 219,370
Int. Cl. H01m 35/16
U.S. Cl. 136—13
14 Claims

ABSTRACT OF THE DISCLOSURE

A lead-acid storage battery of the jelly-roll type is produced by rolling upon a mandrel two electrode strips, each electrode strip comprising a pair of membranes of controlled microporosity with a sheet of pure lead provided with a plurality of spaced perforations interposed between the membranes of each pair. A spreadable mass of colloidal active positive electrode material mixed with acid is introduced into the perforations of one lead sheet and a similar mass of negative electrode material mixed with acid is introduced into the perforations of the other lead sheet. The spreadable electrode material is introduced centrally of the strips of lead in an amount controlled to fill only about 80% of the apertures and to leave apertures adjacent the edges of the strip empty or partially filled to provide for expansion. At one edge of each electrode strip the lead projects beyond the membranes and at the other edge the membranes project beyond the lead with strips of polyethylene lying between the projecting portions of the membranes. There is also wound up with the electrodes strips of lead so as to fill the spaces between the projecting portions of lead of electrodes of like polarity. After winding is complete, the jelly-roll is further wrapped with polyethylene and the projecting portions of lead at each side of the jelly roll are gripped by an embracing clamp.

---

The present invention relates to storage batteries having spiral electrodes and more particularly to batteries of the lead-acid type and to methods for producing the same.

The usual construction of lead-acid storage batteries includes a container for holding the electrolyte in the form of a solution of sulfuric acid of suitable density and in which positive and negative electrodes are suspended in the electrolyte and spaced by suitable separators.

Improvements have been made wherein the electrodes are in the form of thin lead sheets onto which active electrode forming material is applied. The lead strips carrying the appropriate electrode-forming material and suitable separator strips of paper or similar material are spirally wound to form a jelly-roll electrode assembly which is immersed in the electrolyte.

The present invention has as its principal object a battery of the jelly-roll type, the component parts of which are of a quite different construction from the batteries of the prior art.

Another object of the present invention is to provide a battery and method of producing the same which battery will have an energy density that is vastly increased over batteries heretofore developed.

A further object of the present invention is to provide a lead-acid battery of the jelly-roll type in which the active electrode-forming material in the form of a spreadable mass has the electrolyte incorporated therein and is applied to perforated lead sheets and is retained in the perforations in said sheets by microporous diaphragms, the assembly being so rolled up and wrapped as to in effect make it hermetically sealed.

In order to facilitate an understanding of the present invention, reference is made to the accompanying drawing, in which:

FIG. 2 is a fragmentary plan view of a strip of lead sheet suitably perforated and which serves as the support for the active electrode-forming mass of both the positive and negative electrodes.

FIG. 3 is a fragmentary axial cross-sectional view of a portion of the rolled-up electrode assemblies.

FIG. 5 is a view similar to that of FIG. 2 showing one of the electrode-active mass distributing devices.

Figure 1:
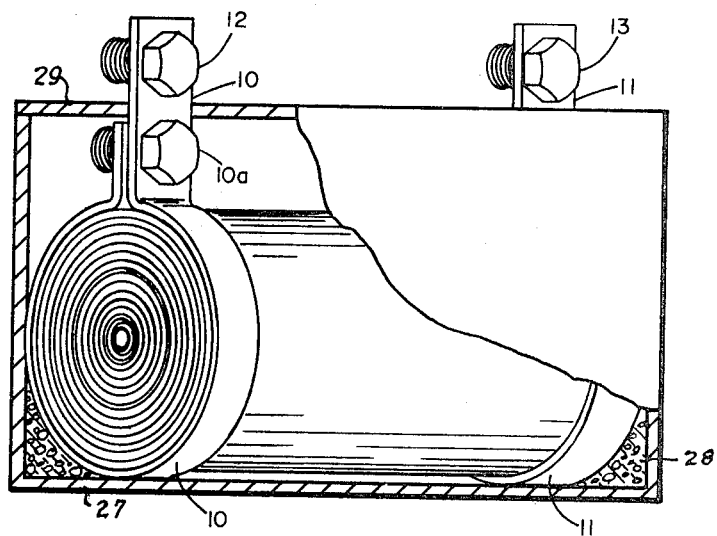
FIG. 1 is a broken-away view of a battery constructed in accordance with the present invention showing the jelly-roll like assemblage of the component electrode and separator parts.

The battery of this invention has been shown as comprising a single cell formed of a positive electrode assembly and a negative electrode assembly. Each electrode comprises a strip 1 of pure lead sheet. As shown in FIG. 2 of the drawing, each lead sheet is provided with openings or perforations 2 which as shown are of hexagonal configuration but obviously may be of circular, rectangular, triangular or other suitable form. It has been found preferable to employ openings 2 of hexagonal formation.

The openings 2 are rather closely spaced and internested to provide the maximum open area between the edges of the strip of lead 1. By way of example, each lead strip can be about 200 feet or more long and of a width of approximately 14 inches. The openings are approximately ½ in. in diameter. It will be noted, however, that the openings do not extend all the way to the side edges of the strip 1. On the other hand, each side of the strip is provided with a solid portion 3 which may be approximately ½ in. on one side and a solid portion 4 which may be approximately ¾ in. to 1 in. on the other side. In addition, at intervals of approximately 1 foot lengthwise of the strip, there are cross members 5 which are solid and are integral with the border strips 3 and 4. As will be pointed out hereinafter, the solid portions 5 serve for current collection, reducing the internal resistance of the cell or battery to practically zero.

In the battery of the present invention, the openings 2 serve as housings or receptacles for the active electrode-forming material. The active material employed in the present invention is colloidal lead for the negative electrode and a colloidal mass of lead dioxide for the positive electrode.

For proper operation of the battery of the present invention and to facilitate its manufacture, the active masses are not flowable but are only spreadable. For this purpose a requisite amount of iron-free, powdered diatomaceous earth is mixed with the active colloidal material to increase its viscosity.

The spreadable mixture of active material and diatomaceous earth also contains a suitable amount of sulfuric acid of proper concentration to cooperate with the active masses to produce an electric current when the battery is connected to a load.

Each electrode strip 1 carrying the appropriate quantity of active electrode material (not shown) in the openings 2 is positioned between membranes 6 and 7 of controlled microporosity. These membranes 6 and 7 are made from polyethylene incorporating iron-free powdered diatomaceous earth. The diatomaceous earth is incorporated in the polyethylene during its manufacture and the mixture is formed into films of approximately 5 mils thickness. The volume percentage of the diatoms may be 50% or less. Membranes 6 and 7 constructed in accordance with this invention are permeable to sulfuric acid but not to the active colloidal masses of electrode material nor to the diatomaceous earth incorporated in said masses.

Referring to FIG. 3 of the drawings, which shows a greatly enlarged cross-sectional view through a portion of the spiral electrodes of the battery, it will be noted that the side edges of the porous polyethylene membranes 6 and 7 are not aligned with the side edges of the lead strips 1 which form the electrode carrier. For instance, portions 1P of the positive electrode lead strip 1 in FIG. 3 project to the left beyond the side edges of the porous polyethylene membranes 6 and 7 and portions 6P and 7P of the porous polyethylene membranes at the right edge project beyond the right edge of the embraced lead carrier strip 1.

On the other hand it will be noted that portions 1N of the lead strip of the negative electrode project to the right beyond the right edges of the porous polyethylene membranes 6 and 7 embracing said negative electrode strip and portions 6N and 7N of the porous polyethylene membranes project to the left beyond the left edge of the embraced lead carrier strip 1 of the negative electrode.

The space between the portions 6P and 7P of the porous polyethylene membranes that project beyond the right edge of the lead strip of the positive electrode is filled with a strip of non-porous polyethylene 8P of a thickness equal to or slightly larger than the thickness of the lead strip. Strip 8P on the left engages the lead strip 1 and on the right is aligned with the right edges 6P and 7P of the porous membranes.

A similar strip 8N fills the space between the projecting portions 6N and 7N of the membranes of the negative electrode.

Further, the space between adjacent projecting portions 1P of the positive lead strip is filled with a lead strip 9P of a thickness equal to the combined thicknesses of the lead strip of the negative electrode plus the four membranes 6 and 7 between adjacent convolutions of the portions 1P of the positive electrode. Strip 9P is of a width equal to the width of the projecting portion 1P.

A similar lead strip 9N fills the space between adjacent convolutions of the projecting portion 1N of the lead strip of the negative electrode.

Due to the aforesaid construction as shown in FIG. 1, one end of the jelly-roll is a rolled up substantially solid mass of lead which forms the positive electrode terminal and the other end is a similar mass of lead which forms the negative electrode terminal. Said ends are embraced by clamps 10 and 11 which are tightly clamped about the rolled-up lead strips by suitable bolts 10a to retain the electrodes assembled and to serve as electric terminal conductors by means of which connections may be made to a load to be supplied by the battery. Suitable terminal screws 12 and 13 are provided for connection to load cables or conductors.

While the jelly-roll electrode assembly comprising the positive and negative lead carrier strips 1, the membranes 6 and 7 embracing each lead strip 1, the polyethylene filler strips 8 and the lead filler strips 9 can be formed in any desired manner, it has been found desirable to form the same in accordance with a method that will now be described.

Figure 4:
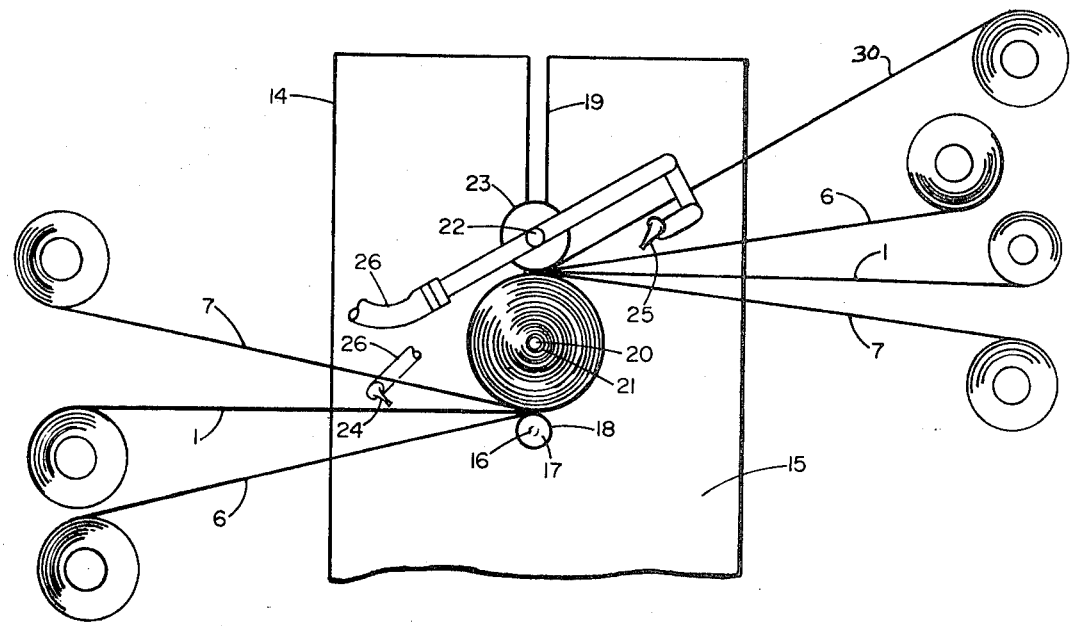
FIG. 4 is a diagrammatic side elevational view of the apparatus for assembling the component parts of the battery of the present invention.

For carrying out the method of forming the jelly-roll-like electrode assembly of this invention, a rather simple apparatus can be used which is somewhat diagrammatically shown in FIG. 4 of the drawings. This apparatus comprises a central frame 14 formed of two spaced plates 15 which are cross braced to maintain them in a vertical position and spaced apart a predetermined distance. Plates 15 are anchored to a floor (not shown) or to any suitable foundation.

A steel shaft 16 extends between the spaced plates 15 and is supported for rotation about its axis in suitable bearings carried by plates 15. Shaft 16 is connected to be driven by a motor (not shown) provided with reduction gearing so that shaft 16 will be rotated at a fairly slow speed. A pulley 17 is secured to shaft 16 by usual key and setscrew (not shown) and the periphery of pulley 17 is covered with a rubber sleeve 18 which is vulcanized to the pulley.

Extending upwardly from shaft 16 is a slot 19 in each plate 15, through which a mandrel-carrying shaft 20 extends and in which said shaft may move vertically.

A tubular mandrel 21 of non-electrical conducting material is mounted on shaft 20 either freely or for rotation therewith. This mandrel may be formed of plastic, fiberglass or similar material. Shaft 20 is provided with removable collars or stops (not shown) to retain the shaft within the slots against axial movement while it is raised therein.

Also extending through the slots 19 is a shaft 22 carrying a roller 23 of hard lead which is heavy and positioned between the plates 15 above the mandrel 21 and its shaft 20.

The battery of the present invention is ideal for use in an electrically driven vehicle and for this purpose the electrode assembly can be formed of strips of pure lead in sheet form of a width, for example, of approximately 14 inches, and a thickness of approximately 10 mils. These pure lead strips 1 are provided with a plurality of apertures or openings 2 of about one-half inch in diameter. As shown in FIGS. 2 and 5 and as previously mentioned, the openings 2 are of hexagonal form and are so formed and arranged in the lead strips as to obtain a maximum number of openings in a given area.

Also as previously mentioned, the edges 3 and 4 of the lead strips 1 are imporate for a distance of ½ to ¾ inch from the side edges of the strips 1. For each strip 1 there are microporous membranes 6 and 7 disposed on each side thereof.

As diagrammatically indicated in FIG. 4, for one electrode a set of one lead strip 1 and two microporous membrane strips 6 and 7 is fed from sources of supply to the nip or bight between the motor-driven roller 17, 18 and the mandrel 21. For the other electrode a similar set of lead and microporous polyethylene strips is fed to the nip or bight between the mandrel 21 and the heavy weighted lead roll 23. All of the strips 1, 6 and 7 are maintained under tension to assure that they will be tightly wrapped upon the mandrel 21. For instance, the lead strips may each be under a tension of ten pounds and each porous polyethylene strip may be under a tension of five pounds.

In starting the wind-up, the upper microporous polyethylene strip 7 on the left side of FIG. 4 had its free end taped to the mandrel 21 and the mandrel was rotated one complete revolution. Next, the free end of the lead strip 1 on the left was taped to the outer periphery of the porous polyethylene strip previously wrapped on the mandrel. In turn the free ends of the strip 6 (from the left) and strips 7, 1 and 6 (from the right) have their free ends taped to the partially covered mandrel and the mandrel rotated each time through one revolution.

After securing the ends of the various lead and microporous polyethylene strips to the mandrel, the strips are desirably tensioned as previously indicated.

At this point it should be noted that whereas the four porous polyethylene strips are wound up with their lateral edges in alignment as indicated in FIG. 3, the two lead strips 1 are laterally offset with respect to the porous polyethylene strips and with each other as also clearly indicated in FIG. 3.

The imperforate edges 3 and 4 of the lead strips are of such width that when these strips are arranged as shown in FIG. 3, the imperforate borders 3 and 4 of one strip 1 will overlay the corresponding imperforate borders of the other strip with the membranes 6 and 7 therebetween so that the perforated regions of the strips will in effect be sealed from the exterior. To make the seal more effective, strips of non-porous polyethylene 8P and 8N are fed into the assembly alongside of the non-projecting edges of the lead strips and between the porous polyethylene strips 6 and 7. The strips 8P and 8N are about 10 to 12 mils in thickness and are about ½ inch in width so that one edge of each strip 8P and 8N is aligned with the corresponding edges of the porous polyethylene strips and the other edge engages the inner edges of the lead strips.

There are also fed into the assembly lead strips 9P and 9N which are of a width equal to the width of projecting portions 1P and 1N of the lead strips (about ½ inch). These strips are of a thickness equal to the sum of the thicknesses of a lead strip plus four porous polyethylene strips as indicated in FIG. 3 of the drawings, i.e. about 30 mils.

After the ends of the various strips are secured to the mandrel the lead roll 23 is put in place and nozzles 24 and 25 are positioned as shown to discharge the spreadable but non-flowable pastes of electrode-forming material into the openings in the lead strips. One nozzle feeds a mixture of colloidal lead, sulfuric acid and diatomaceous earth to the negative electrode assembly and the other nozzle feeds a mixture of colloidal lead dioxide, sulfuric acid and diatomaceous earth to the other electrode assembly.

The nozzles are fed through conduits 26 by metering pumps (not shown) which are driven by the motor which drives the roller 17, 18.

Nozzle 24 may be fixed or immovably positioned as shown in FIG. 4. Nozzle 25, however, is carried by the shaft 22 of the lead roll 23 and moves upwardly as the diameter of the wound-up electrode assembly increases.

Nozzles 24 and 25 deliver a solid stream of the respective electrode-forming mixtures to the center portions of the lead strips so that the openings in the center portions of these strips will be filled or substantially filled with the mixture. After deposit of the active masses on the mid portions of the lead strips, the passage of the strips between the mandrel and roller 18 on one hand and between the mandrel and the lead roller 23 on the other hand squeezes the active mass to the thickness of the lead strips and forces the masses towards the side edges of the strips. However, the openings near the outer edges of the lead strip are empty or only partially filled. This leaves space in the outer 20% of the openings for expansion of the active electrode-forming mixtures.

After the jelly roll reached a predetermined diameter, which by way of example was 14 inches, the feeding of the positive and negative lead strips 1 was terminated and the feed of the active electrode forming masses was also terminated.

The jelly roll was rotated through about three revolutions wrapping on the microporous polyethylene strips which were then cut off and the roll taped to prevent unwrapping. Subsequently a strip 30 of non-porous polyethylene about 14 inches wide and five to six mils in thickness had its end taped to the outer periphery of the roll and the roll was rotated through about 10–15 revolutions. This strip of non-porous polyethylene was under very high tension of fifty pounds.

At this point it should be noted that the mandrel on which the strips are tightly wound should be made of material and of dimensions adequate to withstand the pressure applied thereto by the strips under tension. By utilizing the heavy lead roll 23 and applying tension to the various lead and polyethylene strips, the rolled-up assembly is very compact and tight and the interior active material and acid are hermetically sealed from the exterior.

When the desired number of turns of the non-porous polyethylene strip had been wrapped the strip was cut off and the final roll taped to retain it in rolled-up condition The latter step not only serves to seal the assemblage, but puts very effective pressure on all of the components of the roll keeping all of the junctures of the various strips tightly sealed and absolutely airtight due to the "flow" of the polyethylene when under high tension and pressure.

When the roll-up of the lead and polyethylene strips was completed, the rolled-up electrode assemblies were removed from the apparatus employed. This was accomplished by first removing the roll 23 with nozzle 25 and nozzle feed conduits. Secondly, the rolled-up electrode assembly was removed by lifting the shaft 20 up through the slots 19 in the plates 15. For lifting the roll 23 and the battery from the rolling-up apparatus, two minicranes operating on a single track are provided. First one minicrane is used to lift the heavy lead roll 23 from the slots 19 and to transport the roll to an out of the way location. Next the electrode assembly is lifted and moved to a final assembly table which is provided with a roll-receiving cradle. The collars or stops were removed and the terminal clamps 10 and 11 were put in place to surround the exposed lead portions of the lead strips. By tightening the bolts 10a, the terminal clamps are secured in place which serves to assist in retaining the parts of the assembly in assembled condition and to provide excellent terminals and conductors from the electrodes to the terminals.

Subsequently the assembly is positioned in polypropylene or other type of battery case 27. For better support the rolled-up assembly may be more securely positioned in the case 27 by providing filler blocks 28 or solidified masses of insulating material. Since the rolled-up assembly is hermetically sealed the case 27 may also be similarly sealed by employing a suitable adhesive between the case 27 and its top 29 and about the joints between the top 29 and the terminal positions of the clamps projecting therethrough. Clamps 10 and 11 are made of copper which is coated with lead.

While in the foregoing description it has been stated that diatomaceous earth has been incorporated in the polyethylene to impart microporosity thereto and to the mixture of active electrode material and sulfuric acid, other kinds of porous material may be used. High grade iron-free impalpable diatomaceous earth is available at a relatively low cost, and this is why this material was used.

Other kinds of silica may be used, like silica gel, quartz, etc. However, it must first be ground to an impalpable powder; a very expensive operation. Also iron picked up during the grinding must then be removed by acid washing, water-washing and drying. This results in an expensive product.

It has been found that the battery herein described wherein the active electrode material is mixed with the electrolyte and the two electrodes are separated by microporous polyethylene through which the electrolyte can pass or communicate between electrodes but through which the active material cannot pass, can be made so that it is hermetically sealed from the exterior.

Due to the tremendous active area of the battery of this invention, the charging and discharging rates can be more than 100 times greater than in currently available batteries.

The batteries can be charged in minutes instead of hours. The length of time not much more than is required for a gasoline powered automobile being serviced at a filling station.

A battery constructed as herein described is charged at a voltage which does not exceed 2.15. This can be effected by foolproof electronic control. By charging at a voltage that never exceeds 2.15 there is never any gassing which enables the active masses to be confined in hermetically sealed space resulting in a battery which externally is bone dry.

Having described my invention, I claim:

1. A lead-acid storage battery comprising a first strip of sheet lead having a plurality of openings between the sides edges thereof, a strip of microporous polyethylene disposed on each surface of said strip of lead, a lead dioxide paste mixed with sulfuric acid and a microporous carrier as positive active material carried within the openings of said lead strip and retained therein by said membranes of microporous polyethylene and forming with said lead strip a positive electrode, a second strip of sheet lead having a plurality of openings between the lateral edges thereof, a membrane of microporous polyethylene disposed on each surface of said second lead strip, a paste of lead in colloidal form mixed with sulfuric acid and a microporous carrier as negative active material carried within said openings and retained within said openings by said microporous polyethylene membranes, said second strip of lead and the colloidal lead paste forming a negative electrode, and means enclosing portions of the positive and negative electrodes carrying the active materials in juxtaposition to each other and hermetically sealing said active materials from the exterior.

2. A lead-acid storage battery according to claim 1, wherein said electrodes are in the form of a spiral roll, the lead strip of the positive electrode projecting beyond the microporous diaphragms at one end of the spiral, the lead strip of the negative electrode projecting beyond the microporous membranes at the other end of the spiral, a strip of lead of a width substantially equal to the length of projection of the lead strip of the positive electrode spirally wound with said electrode and completely filling the intervals between the successive convolutions of the projecting portions of the lead strip of the positive electrode, a second lead strip of a width substantially equal to the projecting portions of the lead strips of the negative electrode spirally wound with said electrode and filling the space between the adjacent convolutions of said lead strip of the negative electrode, said projecting portions of the lead strips of the electrodes with the interposed spirally wound lead strips providing terminals for the battery.

3. A battery according to claim 2, wherein the microporous carrier mixed with the lead dioxide paste of the positive electrode and the colloidal lead paste of the negative electrode is powdered diatomaceous earth and forms with the pastes spreadable but non-flowable mixtures.

4. A battery according to claim 3, wherein the spreadable active electrode-forming masses are disposed principally within the 80% portion of the openings lying centrally between the lateral edges of said lead strips and the openings adjacent the lateral edges of the lead strip are unfilled with the active electrode-forming materials.

5. A battery according to claim 4, wherein the rolled-up electrode strips are surrounded by several convolutions of porous polyethylene and subsequently by several convolutions of tightly wound non-porous polyethylene to provide the means for sealing the active material of the electrodes from the exterior.

6. A battery according to claim 2, wherein the portions of the positive electrode strips with the interposed spirally wound strip of lead filling the spaces between adjacent convolutions thereof is gripped by a clamp and the portions of the lead strip of the negative electrode projecting beyond the end of the rolled-up electrodes with the interposed spirally wound lead strip between adjacent convolutions thereof is gripped by a second clamp.

7. A battery according to claim 2, wherein portions of the microporous membrane disposed on each side of the lead strip forming the positive electrode project beyond the edge of the rolled up electrode strip in a direction opposite that of the projecting lead strip and the space between the convolutions of the projecting portions of the microporous membranes is filled by a spirally wound strip of non-porous polyethylene and portions of the microporous membrane disposed on opposite sides of the lead strip of the negative electrode project beyond said lead strip at the end of the roll opposite the projecting portion of the negative lead strip and the space between the same is filled with a spirally wound strip of non-porous polyethylene, the non-porous polyethylene strips serving as part of the means sealing the active material from the exterior.

8. A battery according to claim 7, wherein the rolled-up electrode strips are surrounded by several convolutions of porous polyethylene and subsequently by several convolutions of tightly wound non-porous polyethylene to provide the means for sealing the active material of the electrodes from the exterior.

9. A battery according to claim 8 wherein the portions of the positive electrode strips with the interposed spirally wound strip of lead filling the spaces between adjacent convolutions thereof is gripped by a clamp and the portions of the lead strip of the negative electrode projecting beyond the end of the rolled-up electrodes with the interposed spirally wound lead strip between adjacent convolutions thereof is gripped by a second clamp.

10. A method of making a lead-acid storage battery comprising a first strip of sheet lead having a plurality of openings between the side edges thereof, a strip of microporous polyethylene disposed on each surface of said strip of lead, a lead dioxide paste mixed with sulfuric acid and a microporous carrier as positive active material carried within the openings of said lead strip and retained therein by said membranes of microporous polyethylene and forming with said lead strip a positive electrode, a second strip of sheet lead having a plurality of openings between the lateral edges thereof, a membrane of microporous polyethylene disposed on each surface of said second lead strip, a paste of lead in colloidal form mixed with sulfuric acid and a microporous carrier as negative active material carried within said openings and retained within said openings by said microporous polyethylene membranes, said second strip of lead and the colloidal lead paste forming a negative electrode, and means enclosing portions of the positive and negative electrodes carrying the active materials in juxtaposition to each other and hermetically sealing said active materials from the exterior, comprising the steps of mounting a tubular mandrel on a shaft, positioning the shaft with the mandrel thereon above a power-rotated horizontally disposed roller with axis of the mandrel parallel to that of the roller and with its surface in contact with the surface of the roller, positioning a weighted roller above the mandrel parallel thereto and with its surface in contact with the surface of the mandrel, feeding the lead strips one between the power rotated roller and the mandrel and the other between the mandrel and the weighted roller, feeding the microporous polyethylene strips one above and the other below each lead strip and winding the strips on the mandrel, guiding the mandrel and the weighted roller in upward movement above the power rotated roller as the diameter of the mandrel with the strips wound thereon increases, feeding one of the active materials into the openings in each lead strip between the microporous strips on each side of each lead strip, terminating the feed of the active materials and the feed of the lead strips, wrapping several turns of the microporous polyethylene strips about the rolled-up strips on the mandrel and subsequently wrapping several convolutions of a non-porous polyethylene strip about the rolled-up strips on the mandrel.

11. A method according to claim 10 wherein the lead and microporous polyethylene strips fed to the mandrel are under tension, and the non-porous polyethylene strip is under greater tension.

12. A method according to claim 10 wherein the microporous polyethylene strips are fed in lateral register with each other, the lead strips are fed in offset register with each other and with the microporous polyethylene strips, wherein narrow lead strips are fed between projecting portions of each lead strip and narrow non-porous polyethylene strips are fed between the microporous polyethylene strips unoccupied by lead strips.

13. A method according to claim 11 wherein the microporous polyethylene strips are fed in lateral register with each other, the lead strips are fed in offset register with each other and with the microporous polyethylene strips, wherein narrow lead strips are fed between projecting portions of each lead strip and narrow non-porous polyethylene strips are fed between the microporous polyethylene strips unoccupied by lead strips.

14. A method according to claim 13 wherein terminal clamps are mounted on the portions of the lead strips projecting from each end of the rolled-up assembly.

References Cited
UNITED STATES PATENTS

| | | | |
|---|---|---|---|
| 3,395,043 | 7/1968 | Shoeld | 136—13 |
| 3,472,696 | 10/1969 | Shoeld | 136—13 |
| 3,494,800 | 2/1970 | Shoeld | 136—13 |
| 3,395,044 | 7/1968 | Shoeld | 136—13 |
| 3,141,795 | 7/1964 | Eisler | 136—26 |
| 3,503,806 | 3/1970 | Sugalski | 136—13 |
| 3,576,674 | 4/1971 | Ruben | 136—26 |
| 3,532,545 | 10/1970 | Babusci et al. | 136—13 |
| 3,083,249 | 3/1963 | Belove | 136—13 |
| 3,310,437 | 3/1967 | Dance et al. | 136—13 |

WINSTON A. DOUGLAS, Primary Examiner

C. F. LEFEVOUR, Assistant Examiner

U.S. Cl. X.R.

136—26, 27, 176, 38